(12) United States Patent
Dadheech et al.

(10) Patent No.: US 12,380,450 B1
(45) Date of Patent: Aug. 5, 2025

(54) PERSON-BASED AUTHORIZATION FOR SHARED ACCOUNT SYSTEMS

(71) Applicant: Amazon Technologies, Inc., Seattle, WA (US)

(72) Inventors: Nibha Dadheech, Seattle, WA (US); Anurag Sharma, Bellevue, WA (US); Long Zhang, Issaquah, WA (US); Natalie Thuy-Tien Nguyen, Bellevue, WA (US); Sharad Chaurasia, Redmond, WA (US); Bharath Bhimanaik Kumar, Sammamish, WA (US); Chetan Kishor Rathod, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 320 days.

(21) Appl. No.: 16/918,764

(22) Filed: Jul. 1, 2020

Related U.S. Application Data

(60) Provisional application No. 63/030,280, filed on May 26, 2020.

(51) Int. Cl.
| | | |
|---|---|---|
| *G06Q 20/40* | (2012.01) |
| *G06F 21/60* | (2013.01) |
| *G06F 21/62* | (2013.01) |
| *G10L 17/22* | (2013.01) |
| *G06Q 20/38* | (2012.01) |

(52) U.S. Cl.
CPC ..... *G06Q 20/40145* (2013.01); *G06F 21/604* (2013.01); *G06F 21/62* (2013.01); *G06F 21/6254* (2013.01); *G06Q 20/4093* (2013.01); *G10L 17/22* (2013.01)

(58) Field of Classification Search
CPC ....... G06Q 20/40145; G06Q 20/38215; G06Q 20/4093; G06F 21/6254; G10L 17/22
USPC .......................................................... 705/75
See application file for complete search history.

(56) References Cited

U.S. PATENT DOCUMENTS

| | | | | |
|---|---|---|---|---|
| 7,158,776 B1* | 1/2007 | Estes | ................... | H04L 63/0892 455/410 |
| 2012/0039469 A1* | 2/2012 | Mueller | ............... | G06Q 20/204 380/252 |
| 2014/0047413 A1* | 2/2014 | Sheive | ...................... | G06F 8/33 717/110 |
| 2014/0108263 A1* | 4/2014 | Ortiz | ................... | G06Q 20/3829 705/44 |
| 2014/0282852 A1* | 9/2014 | Vestevich | ............... | G06F 21/52 726/1 |
| 2016/0134665 A1* | 5/2016 | Vendrow | ............. | H04L 65/1053 370/352 |
| 2016/0323247 A1* | 11/2016 | Stein | ...................... | G06Q 20/02 |

(Continued)

*Primary Examiner* — Mohammad A. Nilforoush
*Assistant Examiner* — Wodajo Getachew
(74) *Attorney, Agent, or Firm* — Knobbe, Martens, Olson & Bear, LLP

(57) ABSTRACT

Disclosed are various embodiments for person-based authorization for shared account systems. In one embodiment, a service receives a user request from a client device associated with an account to perform an action using an application. The service then identifies a user originating the user request. The service generates a token that includes an account identifier corresponding to the account and a person identifier corresponding to the user. The service sends the user request and the token to a provider of the application.

20 Claims, 7 Drawing Sheets

(56) References Cited

U.S. PATENT DOCUMENTS

| | | | |
|---|---|---|---|
| 2018/0007060 A1* | 1/2018 | Leblang | H04L 63/107 |
| 2019/0392162 A1* | 12/2019 | Stern | G06F 21/6245 |
| 2020/0097952 A1* | 3/2020 | Piparsaniya | G06F 3/167 |
| 2020/0118173 A1* | 4/2020 | Chu | G06F 16/27 |
| 2021/0119794 A1* | 4/2021 | Shpurov | G06F 21/602 |

* cited by examiner the same household as family members or roommates, or they may be visitors. Much of the interaction between an individual and a shared account device may be generic with respect to all users of the shared device, providing a communal experience. For example, if a user asks a voice interface device, "what is today's weather forecast?", the location of the voice interface device that is associated with the shared account is sufficient to personalize the answer. The identity of the user asking the question is not required to be known to generate the answer.

However, in many scenarios, it would be helpful to personalize the interaction for the particular individual. Suppose that users in a household are playing a trivia game through the voice interface device. The players may be asked randomized trivia questions across different categories. To increase engagement in this game, the trivia application can also request players to provide permission to their contact information. If they do so, players can receive additional fun facts and information about special limited-time trivia challenges. Without personalization, the trivia application is unable to differentiate between users. As a result, the trivia application cannot customize difficulty levels per individual, do bookkeeping of high scores or already asked questions per user, or allow users to configure which categories they are interested in. Further, only the account owner would receive the notifications from the trivia application, and the account owner might not actually be even interested in the trivia application.

In another scenario, a user "Alice" might request via a shared account owned by "Bob" that a reservation be made at a restaurant. The reservation would be made in the name of Bob and the confirmation sent to his email address because Bob is the account owner, but Bob may not be dining with Alice at the restaurant. It would be desirable to make the reservation in Alice's name and to send the confirmation to Alice's own email address.

Various embodiments of the present disclosure introduce approaches for authorizing personalization within a shared account environment on a per-person basis. Individual users that are engaging with a shared account device may be authenticated via voice recognition, face recognition, or other approaches. The users may then authorize some or all of their personal profile information to be shared with various applications via the shared account device. In some cases, these applications may be developed or managed by third parties rather than the proprietor of the shared account system. With the consent of the recognized user, a token can be generated and shared with the application, where the token includes both an account-level identifier and a person-level identifier. By contrast, if a user is unrecognized or does not consent to sharing personal information, the application may receive a token that includes the account-level identifier but not the person-level identifier.

As one skilled in the art will appreciate in light of this disclosure, certain embodiments may be capable of achieving certain advantages, including some or all of the following: (1) improving the privacy and security of computer systems by allowing an individual user the ability to control sharing of personal information through a shared account device; (2) improving the functionality of computer systems and networks by allowing person-specific actions to be completed via interactions with a shared account device that is shared by a number of individuals; (3) enhancing computer authentication and authorization protocols by augmenting a token to include a person identifier in addition to an account identifier, thereby allowing third-party systems to identify a specific person in the context of a shared account

PERSON-BASED AUTHORIZATION FOR SHARED ACCOUNT SYSTEMS

CROSS-REFERENCE TO RELATED APPLICATIONS

This application claims the benefit of U.S. Provisional Application No. 63/030,280, entitled "PERSON-BASED AUTHORIZATION FOR SHARED ACCOUNT SYSTEMS," and filed on May 26, 2020, which is incorporated herein by reference in its entirety.

BACKGROUND

Voice interface devices, smart televisions, and Internet of Things (IoT) devices may be shared by several users. For example, multiple individuals residing in a household may speak a voice command to a voice interface device to obtain the latest weather forecast, to play music, to hear the latest news, to ask a question, and so forth. Although the devices may be used by multiple individuals, such devices are typically authenticated for access to a single account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to person-based authorization for shared account systems. Voice interface devices, smart televisions, and Internet of Things (IoT) devices are typically logged into a single account but may be used by multiple individuals. These individuals may also reside in device; (4) reducing computer resource consumption (e.g., in terms of processor time, memory consumption, and bandwidth usage) associated with users logging out and logging in a device via separate accounts; and so forth.

Figure 1:
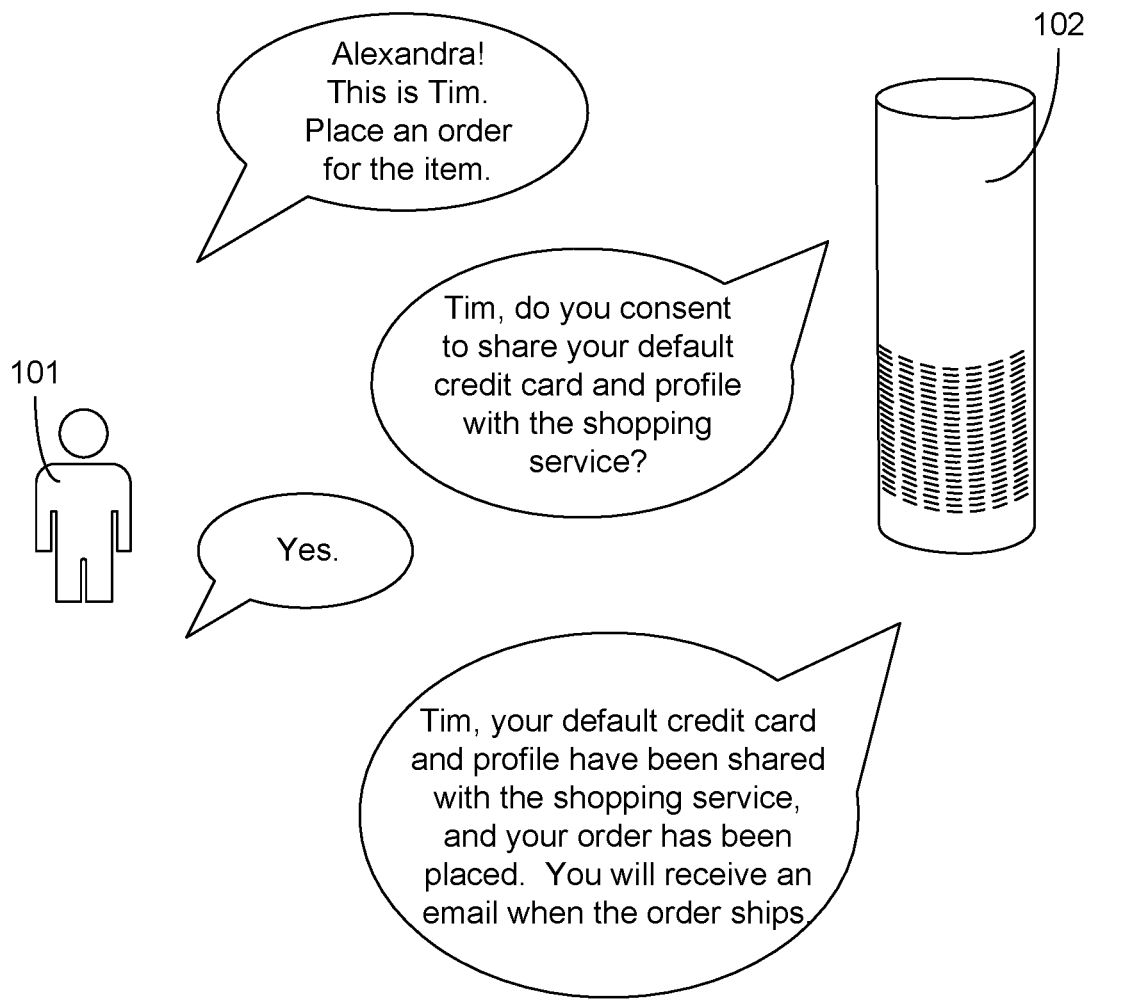
FIG. 1 is a drawing of an example scenario according to various embodiments of the present disclosure.

Referring now to FIG. 1, shown is a drawing of one example scenario 100 according to various embodiments of the present disclosure. In FIG. 1, a user 101 is interacting with a voice interface device 102. The voice interface device 102 may be communally shared by multiple users and registered to a single account. This example begins with the user 101 saying a wake word, e.g., "Alexandra," and then identifying himself as "Tim." As shown, the user 101 explicitly says, "this is Tim," but in other examples the user 101 may be automatically identified based at least in part on voice recognition based on speech including the wake word and/or other speech. The user 101 also speaks a command to "place an order for the item."

After identifying the user 101 and recognizing the command, the voice interface device 102 then asks the user 101 to provide consent to share his "default credit card and profile with the shopping service." In other words, the voice interface device 102 determines that in order to perform the requested action in a way that is personalized for the user 101, the user 101 would need to consent to share his "default credit card and profile." Alternatively, the user 101 may ask to have the requested action performed using an account default payment instrument and profile information.

The user 101 then consents to the request by replying, "yes." Upon recognizing the consent, the voice interface device 102 commences a workflow to accomplish the command, i.e., to place the order for the requested item. The voice interface device 102 then responds. "Tim, your default credit card and profile have been shared with the shopping service, and your order has been placed," which indicates that the sharing of personalized profile information has taken place and the command has been carried out. The voice interface device 102 further responds that "you will receive an email when the order ships," which indicates that the user's email address, which has been shared with the shopping service as part of the request, will be used for sending the order shipment confirmation. This would be in lieu of sending the order shipment confirmation to a default email address associated with the account, which may be managed by or accessible to a different person.

Providing distinct person and account identifiers and associated profile data to third-party applications can benefit several different scenarios. In one scenario, two users in a residence may share an account to purchase items through an online retailer, but they may not share their finances. When making a purchase, recognizing the individual user would allow a default payment method for the individual user to be used, rather than a default payment method for the account, which would help keep their finances separate.

In another scenario, a user can shop for clothes via a third-party online retailer with the user's own shopping profile, which can be customized, thereby allowing the third-party online retailer to automatically show the user only those clothes that are the user's size. The user via the same account can swap to the profile of another user of the same account in order to buy clothes for that other user, in the other user's own size. The user's shopping profile may be enhanced with account-level interests, which may include preferred fashions, colors, brands, etc.

In yet another scenario, one user in a residence may be a fan of one type of music, while another user in the same residence may prefer a different type of music. When either of the users log in to a music application using a shared account, the type of music presented is customized for the individual user once that user is identified. In other examples, a game application can request to incorporate the user's name for a global leaderboard. Further, a food delivery application can request to send updates on the food delivery status to users on their mobile number.

Developers can configure their applications to request permission to access various information from an individual's profile, including, for example, full name, given name or first name, mobile number, and other information. When an individual with a recognized voice profile enables an application that requests to use their contact information, the individual may be prompted in a client application to consent to allow the application to access their information. When the individual interacts with the application, a service sends a token in addition to the person identifier to the application's back-end logic. The person identifier and the token may be strings of characters and numbers and may not contain any personally identifiable information. The application can use the token to call a Person Profile API to access the individual's profile information. If the individual has not yet granted consent to the application, the application can display a special permissions user interface to ask for their consent dynamically.

Once an individual grants permission, the application can request to incorporate contact information for purposes that meet requirements for protecting personal information. These permissions may be disabled by default until an individual enables them. An individual can manage their permissions at any time through a client application and can opt out of skills personalization at any time. If an individual has opted out of personalization or if a person is not recognized, the service does not send a person identifier in the request to the application, and the token cannot be used to retrieve the individual's information from the Person Profile API. A fallback experience may then be entered. In the following discussion, a general description of the system and its components is provided, followed by a discussion of the operation of the same.

Figure 2:
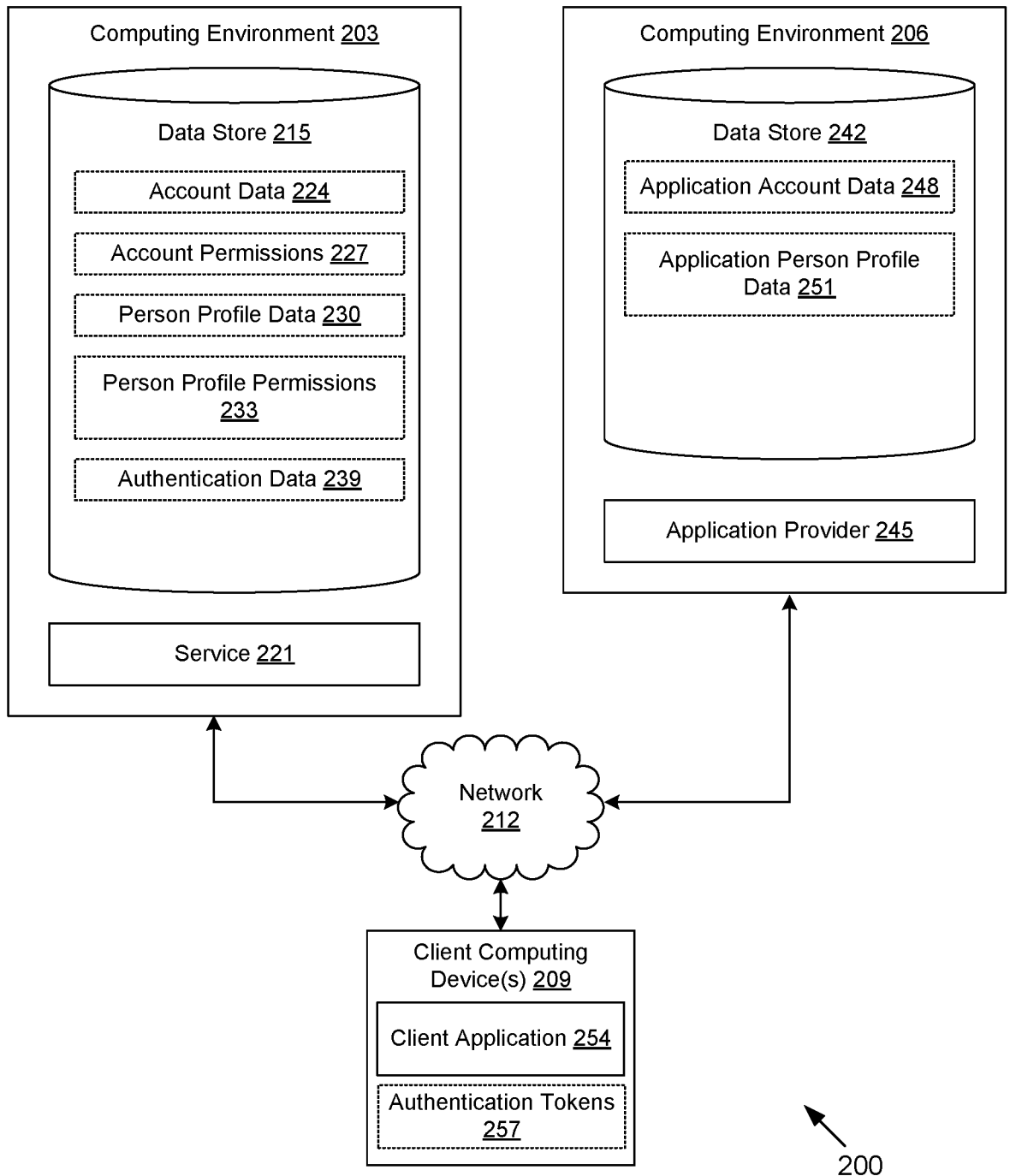
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more computing environments 206, and one or more client computing devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks. The computing environment 203, the computing environments 206, and the client computing devices 209 may be separate entities, or independent and distinct computing systems that are physically and/or logically isolated. Further, the computing environment 203, the computing environments 206, and the client computing devices 209 may be operated and/or managed by different entities.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a service 221 and other applications, services, processes, systems, engines, or functionality not discussed in detail herein. The service 221 is executed to provide backend supporting functionality for the client computing device 209. In various embodiments, the service 221 may provide natural language processing, voice recognition, speech synthesis, remote control, voice command processing, face recognition, gesture processing, and/or other functionality to support the client computing devices 209. In some cases, the client computing device 209 will remain in an authenticated state with the service 221 for a given account after an initial configuration procedure. In some embodiments, the service 221 acts as a federated identity provider on behalf of one or more third-party applications, so that a single log-in with the service 221 by the client computing device 209 will authenticate the client computing device 209 with one or more other third-party applications in computing environments 206.

In various embodiments, the service 221 may represent a plurality of services including an identity provider service, a voice interaction service, a profile data management service, an authentication service, a permissions service, and other services.

The data stored in the data store 215 includes, for example, account data 224, account permissions 227, person profile data 230, person profile permissions 233, authentication data 239, and potentially other data. The account data 224 corresponds to the accounts through which client computing devices 209 access the service 221. The account data 224 may include profile information, such as name and contact information for the account owner, interaction history, purchased items, and other information. The account data 224 may associate each account with a unique account identifier.

The account permissions 227 may control what types of actions may be performed via a given account. Such actions may include purchasing items, performing certain types of commands, adding users, adding first-party or third-party applications, and so on. The account permissions 227 may also define what portions of the account data 224 may be shared with third parties, which could include all third parties or specifically enumerated third parties. In some cases, the account permissions 227 may definite a parental control feature, whereby certain actions may be restricted or require additional authentication challenges to perform due to enabled parental controls.

The person profile data 230 corresponds to profile data individually associated with a person. To this end, the person profile data 230 may include information such as name, email address, purchase history, birthdate, mailing address, and/or other personally identifying information. The person profile data 230 may include information that is similar to that of the account data 224 except that the account data 224 is associated with either the account owner or multiple users of the account, while the person profile data 230 is associated with a single person. The person profile data 230 may associate each person with a unique person identifier.

The person profile permissions 233 may control what types of actions may be performed for or by a person. Such actions may include purchasing items, performing certain types of commands, adding first-party or third-party applications, and so on. The person profile permissions 233 may also define what portions of the person profile data 230 may be shared with third parties, which could include all third parties or specifically enumerated third parties. In some cases, the person profile permissions 233 may definite a parental control feature, whereby certain actions may be restricted or require additional authentication challenges to perform due to enabled parental controls.

The authentication data 239 includes data used to authenticate individuals or accounts. This data may include usernames, passwords, public or private keys, symmetric keys, registration credentials, voice recognition profiles, face recognition profiles, fingerprint profiles, and so on.

The computing environment(s) 206 may be operated by a third party to provide applications to the client computing device 209 by way of the service 221. The computing environment 206 may comprise, for example, a server computer or any other system providing computing capability. Alternatively, the computing environment 206 may employ a plurality of computing devices that may be arranged, for example, in one or more server banks or computer banks or other arrangements. Such computing devices may be located in a single installation or may be distributed among many different geographical locations. For example, the computing environment 206 may include a plurality of computing devices that together may comprise a hosted computing resource, a grid computing resource, and/or any other distributed computing arrangement. In some cases, the computing environment 206 may correspond to an elastic computing resource where the allotted capacity of processing, network, storage, or other computing-related resources may vary over time.

Various applications and/or other functionality may be executed in the computing environment 206 according to various embodiments. Also, various data is stored in a data store 242 that is accessible to the computing environment 206. The data store 242 may be representative of a plurality of data stores 215 as can be appreciated. The data stored in the data store 242, for example, is associated with the operation of the various applications and/or functional entities described below.

The components executed on the computing environment 206, for example, include an application provider 245 and other applications, services, processes, systems, engines, or functionality not discussed in detail herein. The application provider 245 is executed to provide functionality for an application to the client computing device 209 via the service 221. Various applications may enable online shopping, banking activities, gaming, management of IoT devices, podcasts, music playing, task list management, and other activities. In some embodiments, the applications provided by the application provider 245 may be referred to as "skills" provided through the service 221. In various scenarios, the application provider 245 and the service 221 may be operated by the same entity or by different entities. That is to say, the application provider 245 may be considered a third party relative to the service 221.

The data stored in the data store 242 includes application account data 248, application person profile data 251, and/or other data. The application account data 248 corresponds to data maintained by the application provider 245 in association with accounts. For example, the application account data 248 may contain state, history, or customizations for the application based at least in part by usage under a particular account. The application person profile data 251 corresponds to data maintained by the application provider 245 in association with individual persons. For example, the application person profile data 251 may contain state, history, or customizations for the application based at least in part by usage by an individual person.

The client computing device 209 is representative of a plurality of client devices that may be coupled to the network 212. The client computing device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. In particular, the client computing device 209 may function as a shared account device such that it is available to be used by multiple users having physical access to it, while the client computing device 209 is logged in for accessing a single account. For example, the client computing device 209 may correspond to a living room device, a wall mounted device, an IoT device, and so forth.

The client computing device 209 may be configured to execute various applications such as a client application 254 and/or other applications. The client application 254 may be executed in a client computing device 209, for example, to access network content served up by the computing environment 203 and/or other servers. In various embodiments, the client application 254 is always logged in to the service 221 via long-lived authentication tokens 257 that serve as registration credentials for a specific account.

In various embodiments, the client application 254 functions as a voice interface, whereby the client application 254 enters a listening mode in response to detecting a wake word or another environmental stimulus. The client application 254 may record voice commands and/or audio and transmit the commands and/or audio to the service 221 via the network 212 for processing. In response, the client application 254 may receive data encoding synthesized speech from the service 221 and then render the synthesized speech via a speaker. The client computing device 209 may be configured to execute applications beyond the client application 254 such as, for example, email applications, social networking applications, word processors, spreadsheets, and/or other applications.

In some embodiments, multiple client computing devices 209 may be used by the user. For example, one client computing device 209 may correspond to a voice interface device or an IoT device, while another client computing device 209 may correspond to a smartphone or tablet device executing a companion client application 254 to control the operation of the voice interface device or the IoT device. In one scenario, the companion client application 254 may be used to provide consent to share information with an application provider 245.

Figure 3:
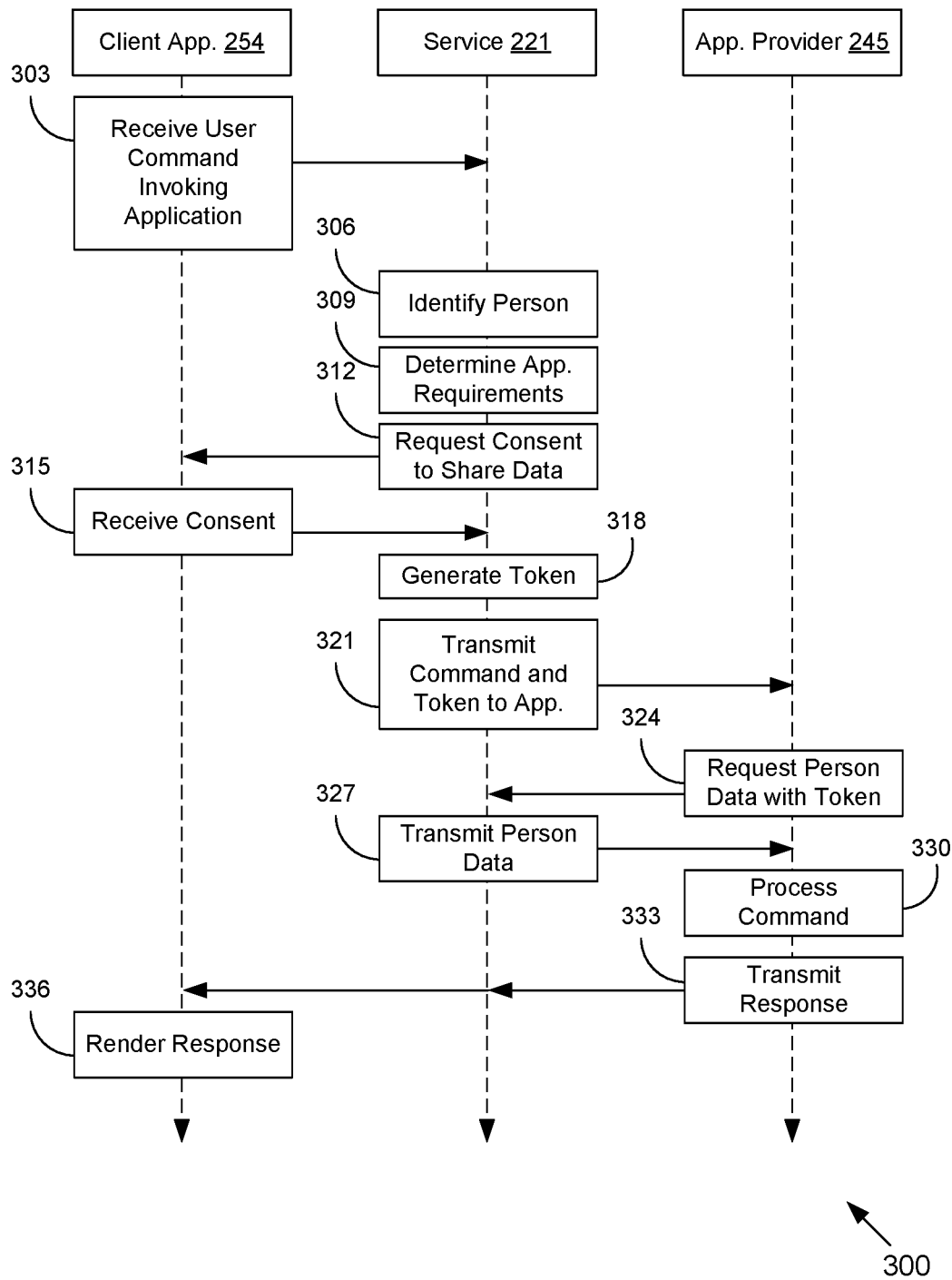
FIG. 3 is a sequence diagram illustrating one example interaction among a client application executed in a client computing device, a service executed in a computing environment, and an application provider executed in a computing environment in the networked environment of FIG. 2 according to various embodiments of the present disclosure.

Turning now to FIG. 3, shown is a sequence diagram 300 that provides one example of the interaction among the client application 254, the service 221, and the application provider 245 according to various embodiments. It is understood that the sequence diagram 300 provides merely an example of the many different types of functional arrangements that may be employed to implement the operation of the client application 254, the service 221, and the application provider 245 as described herein. As an alternative, the sequence diagram 300 may be viewed as depicting an example of elements of a method implemented in the networked environment 200 (FIG. 2) according to one or more embodiments.

Beginning with box 303, the client application 254 receives a user command invoking a particular application provided by the application provider 245. For example, the user may speak a voice command to enable the particular application or to perform an action using the particular application. The client application 254 may perform initial processing of the user command and then forward data encoding the user command to the service 221 via the network 212 (FIG. 2).

In box 306, the service 221 identifies the person who issued the command. For example, the command may include an explicit identification of the person (e.g., the person saying "this is Tim" or "this is Joanna"). Alternatively, the command may be processed to implicitly identify the person. For example, voice recognition may be applied to speech and face recognition may be applied to video to recognize the person from a set of possible users.

In box 309, the service 221 determines requirements of the application as part of processing the command. For example, the service 221 may determine that the application requires specific profile information about the user in order to process the command. In this regard, the service 221 may make the requirements determination with respect to stored data in the data store 215 (FIG. 2), or the service 221 may communicate with the application provider 245 via an application programming interface (API) in order to learn the requirements.

In box 312, upon determining the application requirements, the service 221 sends a request for the user's consent to share the data requested by the application to the client application 254. In other embodiments, the request for the user's consent may be sent to the client application 254 by the application provider 245. In one embodiment, the client application 254 may then render the consent request as a verbal question played via a speaker, e.g., "the application is requesting access to your personal profile; do you wish to grant access?" In other embodiments, the client application 254 may render the specific types of information for which the application is requesting access.

In box 315, the client application 254 receives consent to share the information from the user. For example, the user may reply "yes," or the user may reply with an explicit identification of the types of personal information that may be shared with the application provider 245. Other forms of consent may include selecting a component on a touch interface of a companion application, scanning a badge, sending an email, clicking on a link in an email, and so on. It is noted that the consent may be stored in the person profile permissions 233 (FIG. 2) so that obtaining consent is not necessary for subsequent interactions with the particular application provider 245. In some cases, consent may apply across all persons associated with the account (e.g., consent to share a first name), while in other cases (e.g., consent to share health data), consent may be limited in scope to the particular person. In some embodiments, consent may apply across multiple accounts of the person, when the person uses multiple accounts. In such cases, the user may be asked to consent for all accounts, specific accounts, or only the current account that he or she uses. Instead of giving consent, the user may choose to withhold consent, thus terminating the flow.

In some cases, consent of multiple users may be required. For example, in one scenario, the account owner may be required to consent in addition to the particular person. In another scenario, all users of the account may be required to consent. If multiple users are required to consent, and one or more users are not present at the client computing device 209, the flow may block and wait for consent by the absent users via potentially other channels of communication. Alternatively, the flow may fail due to lack of required consent from one or more users.

In box 318, upon receiving consent, the service 221 generates a token for use by the application provider 245. The token may encode an account identifier as well as a person identifier. The identifiers may be encrypted within the token and/or the identifiers may be anonymized so that application providers 245 cannot share or correlate the identifiers. In box 321, the service 221 transmit the command and the token to the application provider 245.

The application provider 245 is then able to request specific items of person profile data 230 (FIG. 2) to which it has been granted access in box 324 by requesting the items from the service 221 using the token. In response, the service 221 can verify that the application provider 245 has been granted access to the information with reference to the person profile permissions 233 (FIG. 2) and then transmit the requested person profile data 230 to the application provider 245 in box 327.

In box 330, upon obtaining the person profile data 230, the application provider 245 processes the command. In box 333, the application provider 245 then transmits the response to the client application 254 via the service 221. In box 336, the client application 254 renders the response. For example, the client application 254 may synthesize speech corresponding to the response from the application provider 245. Thereafter, the sequence diagram 300 ends.

Figure 4:
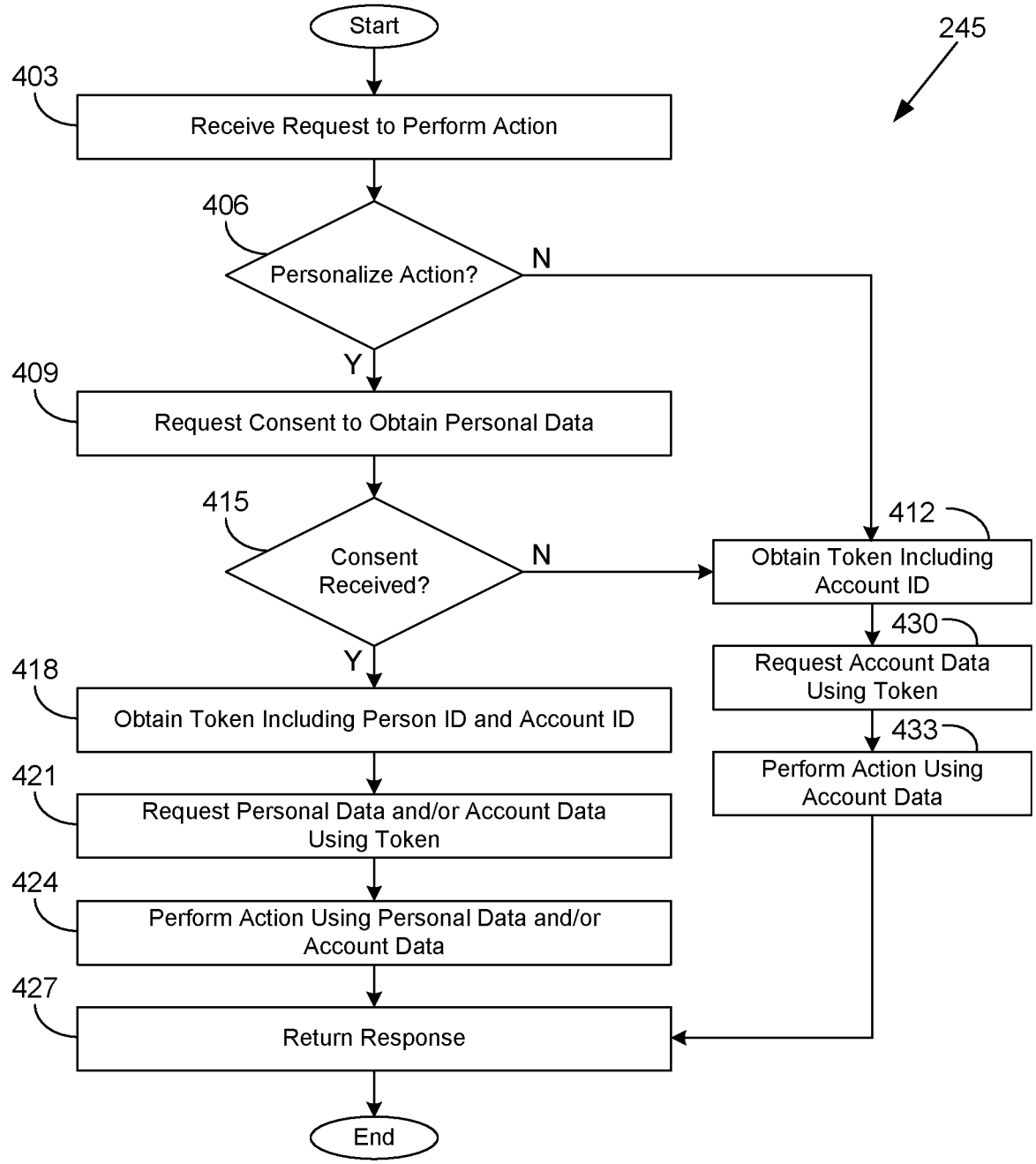
FIG. 4 is a flowchart illustrating one example of functionality implemented as portions of an application provider executed in a computing environment in the networked environment of FIG. 2 according to various embodiments of the present disclosure.

Referring next to FIG. 4, shown is a flowchart that provides one example of the operation of a portion of the application provider 245 according to various embodiments. It is understood that the flowchart of FIG. 4 provides merely an example of the many different types of functional arrangements that may be employed to implement the operation of the portion of the application provider 245 as described herein. As an alternative, the flowchart of FIG. 4 may be viewed as depicting an example of elements of a method implemented in the computing environment 206 (FIG. 2) according to one or more embodiments.

Beginning with box 403, the application provider 245 receives a request to perform an action. The request may have originated via a client application 254 (FIG. 2) executed in a client computing device 209 (FIG. 2). The request may have been received by the application provider 245 by way of the service 221 (FIG. 2) providing backend functionality for the client computing device 209.

In box 406, the application provider 245 determines whether the action should be personalized. In other words, the application provider 245 determines whether the action should be customized for an individual person as opposed to an account associated with the client application 254. It is noted that the application provider 245 may not be permitted to personalize the action in situations where the person requesting to perform the request cannot be identified, or if personalization has been disabled. If the application provider 245 determines to personalize the action, the application provider 245 continues from box 406 to box 409.

Otherwise, if the application provider 245 determines not to personalize the action, the application provider 245 moves from box 406 to box 412.

In box 409, the application provider 245 requests consent from the user to obtain personal data associated with the user from the person profile data 230 (FIG. 2). For example, the application provider 245 may request the user's first name, age, email address, and/or other information. In some cases, the consent may apply to all users on a shared account, while in other cases, the consent may apply only to a particular user giving consent. In alternative embodiments, consent may be specified by the user through a consent management user interface in advance of requesting the action. In some embodiments, in addition to consent, a particular authentication assurance level may need to be reached for the person in order for consent to be provided or for the type of personal data to be given to the application provider 245. For example, in some situations, the user may be asked to answer or respond to one or more additional authentication challenges (e.g., answer knowledge-based questions) in order to increase the level of authentication assurance to proceed with properly consenting or having personal data transferred.

In box 415, the application provider 245 determines whether consent has been received. For example, the service 221 may notify the application provider 245 that consent has been received via an API call. If consent has been received, the application provider 245 moves from box 415 to box 418. If consent has not been received, the application provider 245 instead moves from box 415 to box 412.

In box 418, the application provider 245 obtains a token from the service 221 that includes both an account identifier and a person identifier. Subsequently, the application provider 245 may be able to correlate actions associated with the same person identifier as corresponding to the same person, even if personal data is not provided to the application provider 245. This may be useful to improve the experience of an individual interacting with the application provider 245 over an extended time period or via multiple actions. However, effective consent may be required from the user even for this anonymized correlation of the person identifier. In various embodiments, the token may conform to the OAUTH specification.

In box 421, the application provider 245 requests one or more items of personal data from the service 221 by presenting the token including the person identifier. The request may specify the particular items of personal data that are sought, and the service 221 may grant or deny access to the particular items based on the person profile permissions 233 (FIG. 2). If permitted, the service 221 returns the requested items of personal data to the application provider 245. Likewise, the application provider 245 may also request one or more items of account data 224 (FIG. 2) from the service 221 by presenting the token including the account identifier. The request may specify the particular items of account data 224 that are sought, and the service 221 may grant or deny access to the particular items based on the account permissions 227 (FIG. 2). If permitted, the service 221 returns the requested items of account data 224 to the application provider 245.

In some cases, even when the user has provided consent, certain items of personal data may be unavailable. In such cases, the application provider 245 may cause the user to be prompted to supply the missing or unavailable information in order for the requested action to be performed.

In box 424, the application provider 245 performs the action using the received items of personal data and/or account data 224. For example, the application provider 245 may generate an email to an email address of the person or of the account owner, or the application provider 245 may generate a response to the request to perform the action that is customized with the person's name. If permitted by the user, the application provider 245 may record items of personal data and/or account data 224 in the application account data 248 (FIG. 2) or the application person profile data 251 in association with the account identifier and/or the person identifier for future reference to improve the user experience.

In box 427, the application provider 245 returns a response to the service 221. In some cases, the application provider 245 may return the response to the client computing device 209 directly. For example, the response may include a verbal confirmation that an order has been placed or that a banking action has been performed, music to be played, a trivia question, and/or other types of responses. Thereafter, the operation of the portion of the application provider 245 ends.

If the application provider 245 instead determines that the action is not to be personalized in box 406, or the application provider 245 instead determines that consent to personalize is not received in box 415, the application provider 245 moves to box 412. In box 412, the application provider 245 obtains a token from the service 221 that includes the account identifier but not the person identifier.

In box 430, the application provider 245 may request one or more items of account data 224 from the service 221 by presenting the token including the account identifier. The request may specify the particular items of account data 224 that are sought, and the service 221 may grant or deny access to the particular items based on the account permissions 227 (FIG. 2). If permitted, the service 221 returns the requested items of account data 224 to the application provider 245.

In box 433, the application provider 245 performs the action using the received items of account data 224. For example, the application provider 245 may generate an email to an email address of the account owner. If permitted by the account owner, the application provider 245 may record items of account data 224 in the application account data 248 in association with the account identifier for future reference to improve the user experience.

In box 427, the application provider 245 returns a response to the service 221. In some cases, the application provider 245 may return the response to the client computing device 209 directly. For example, the response may include a verbal confirmation that an order has been placed or that a banking action has been performed, music to be played, a trivia question, and/or other types of responses. Thereafter, the operation of the portion of the application provider 245 ends.

In other implementations, when a user does not provide consent to perform an action, the application provider 245 may not be able to perform the action with only the account-level information. In such cases, the application provider 245 may cause a graceful fallback message to be presented to the user.

Figure 5:
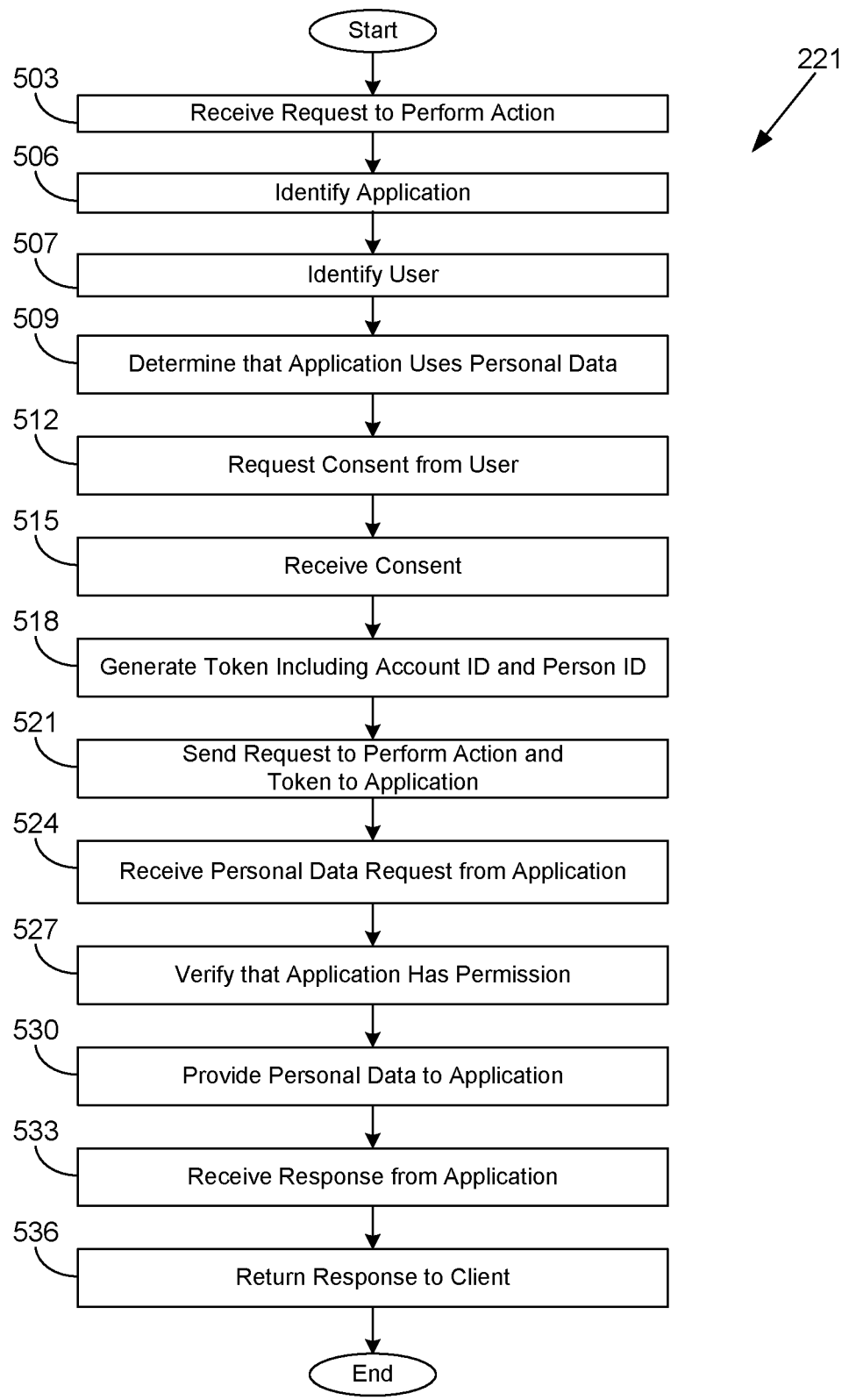
FIG. 5 is a flowchart illustrating one example of functionality implemented as portions of a service executed in a computing environment in the networked environment of FIG. 2 according to various embodiments of the present disclosure.

Moving on to FIG. 5, shown is a flowchart that provides one example of the operation of a portion of the service 221 according to various embodiments. It is understood that the flowchart of FIG. 5 provides merely an example of the many different types of functional arrangements that may be employed to implement the operation of the portion of the service 221 as described herein. As an alternative, the flowchart of FIG. 5 may be viewed as depicting an example of elements of a method implemented in the computing environment 203 (FIG. 2) according to one or more embodiments.

Beginning with box 503, the service 221 receives a request to perform an action. For example, a user may issue a verbal command to the client computing device 209 (FIG. 2) or perform a gesture captured by the client computing device 209. The client application 254 (FIG. 2) executed on the client computing device 209 may then encode the request as data and transmit the data via the network 212 to the service 221. The client application 254 and the client computing device 209 may be authenticated for access to an account using a long-lived credential, such as a registration credential.

In box 506, the service 221 identifies an application implicated in the request. In one example, the request may explicitly mention the name of an application. In another example, the request may use language that is registered to be associated with the application (e.g., asking for a task to be performed, where only the application is registered to be capable of performing the task).

In box 507, the service 221 identifies the user. This may include authenticating the user. For example, the service 221 may perform voice recognition on a verbal command supplied by the user to identify the user as being one of multiple users who use the account and client computing device. Alternatively, the user may be identified by the user presenting a username, a password, an answer to a knowledge-based question, a fingerprint scan, a retinal scan, a face scan, or other identifier.

In box 509, the service 221 determines that the application uses personal data from the person profile data 230 (FIG. 2). In one embodiment, the data store 215 may include data indicating a dependency of an application on one or more types of personal data. In another embodiment, the service 221 may communicate with the application provider 245 (FIG. 2) for the application via an API to determine whether it uses personal data.

In box 512, the service 221 requests consent from the user to share the personal data. For example, the service 221 may cause the client application 254 to render a question, via speech synthesis, asking the user whether to approve sharing the personal data. Alternatively, if a graphical user interface is available, the service 221 may cause the client application 254 to render a graphical user interface requesting consent. Consent may be elicited through a simple yes or no reply, or the user may specify specific items or subsets of items that may be shared with the particular application. The consent may be application specific, or may apply to all first-party applications, all third-party applications, or all third-party applications from a particular source entity. In box 515, the service 221 receives the consent from the user via the client application 254.

In box 518, the service 221 generates a token including the account identifier and the person identifier. In one embodiment, the service 221 may generate the token in accordance with the OAUTH specification (e.g., OAUTH 2.0). In box 521, the service 221 sends the request to perform the action and the token to the application provider 245 via an API call. In some cases, the service 221 may send the request to perform the action to the application provider 245, and the application provider 245 may request the token from the service 221 in a subsequent API call.

In box 524, the service 221 receives a request for one or more items of personal data from the application provider 245. The request may include the token having the person identifier or may specify the person identifier separately. In box 527, the service 221 verifies that the application has permission to access the requested items of personal data based at least in part on the previous consent reflected in the person profile permissions 233.

If the application has permission, in box 530, the service 221 provides the personal data to the application provider 245. In box 533, the service 221 may receive a response from the application provider 245 corresponding to the completed processing of the action. For example, the application provider 245 may indicate whether the action was successfully performed, or the application provider 245 may return some information or media item as a result. In box 536, the service 221 returns the response to the client application 254 for presentation to the user. For example, the service 221 may return data that encodes a verbal confirmation of the action. Thereafter, the operation of the portion of the service 221 ends.

Figure 6:
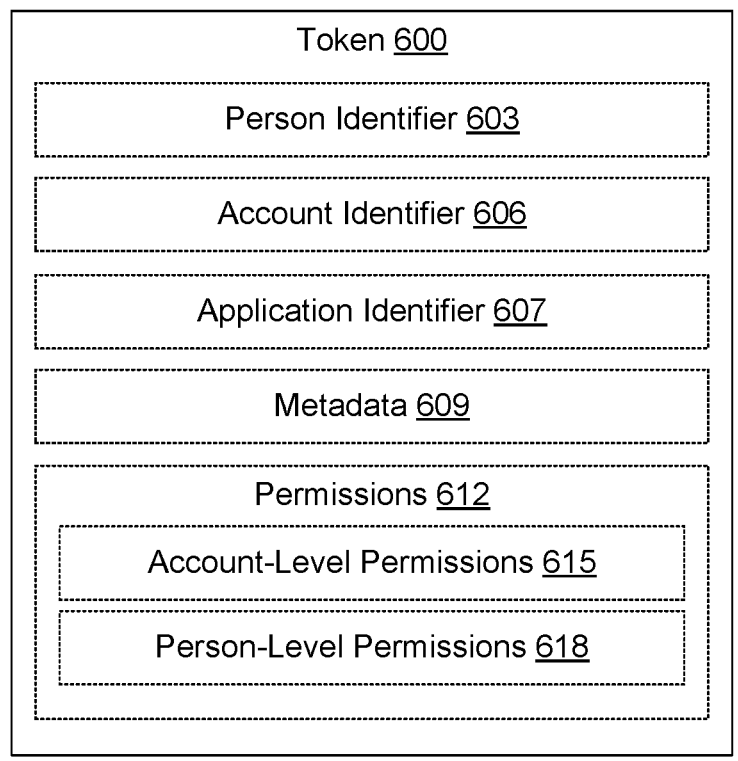
FIG. 6 is a block diagram showing one example of a token according to various embodiments of the present disclosure.

Referring next to FIG. 6, shown is a block diagram illustrating one example of a token 600 according to various embodiments. The token 600 may be issued by the service 221 (FIG. 2) to an application provider 245 (FIG. 2) and subsequently used by the application provider 245 to obtain information about a user or account from the service 221.

In this example, the token 600 includes a person identifier 603 that uniquely identifies a person, an account identifier 606 that uniquely identifies an account, an application identifier 607 that uniquely identifies the application or third-party operating the application provider 245, metadata 609, permissions 612 for accessing account data 224 (FIG. 2) or person profile data 230 (FIG. 2), a username, encrypted context, and/or other data. In one embodiment, the token 600 corresponds to a Base 32-encoded blob in JavaScript Object Notation (JSON), Ion, or another data format. The permissions 612 and/or other data may be encoded and/or encrypted into another token within the token 600, where the encrypted contents may not be decoded or tampered with by the application provider 245. The permissions 612 may include account-level permissions 615 that control access to resources at the account-level and/or person-level permissions 618 that control access to resources at the person-level.

In some embodiments, the person identifier 603 may be the same as an account identifier 606 of an account controlled by that person, even though the person may share another account owned by another person (e.g., for the purpose of accessing a living-room-type device). In other words, the person identifier 603 and the account identifier 606 may be unique identifiers within the same shared space of identifiers. In other cases, the person identifier 603 and the account identifier 606 may be unique within a respective person identifier space and a respective account identifier space.

Figure 7:
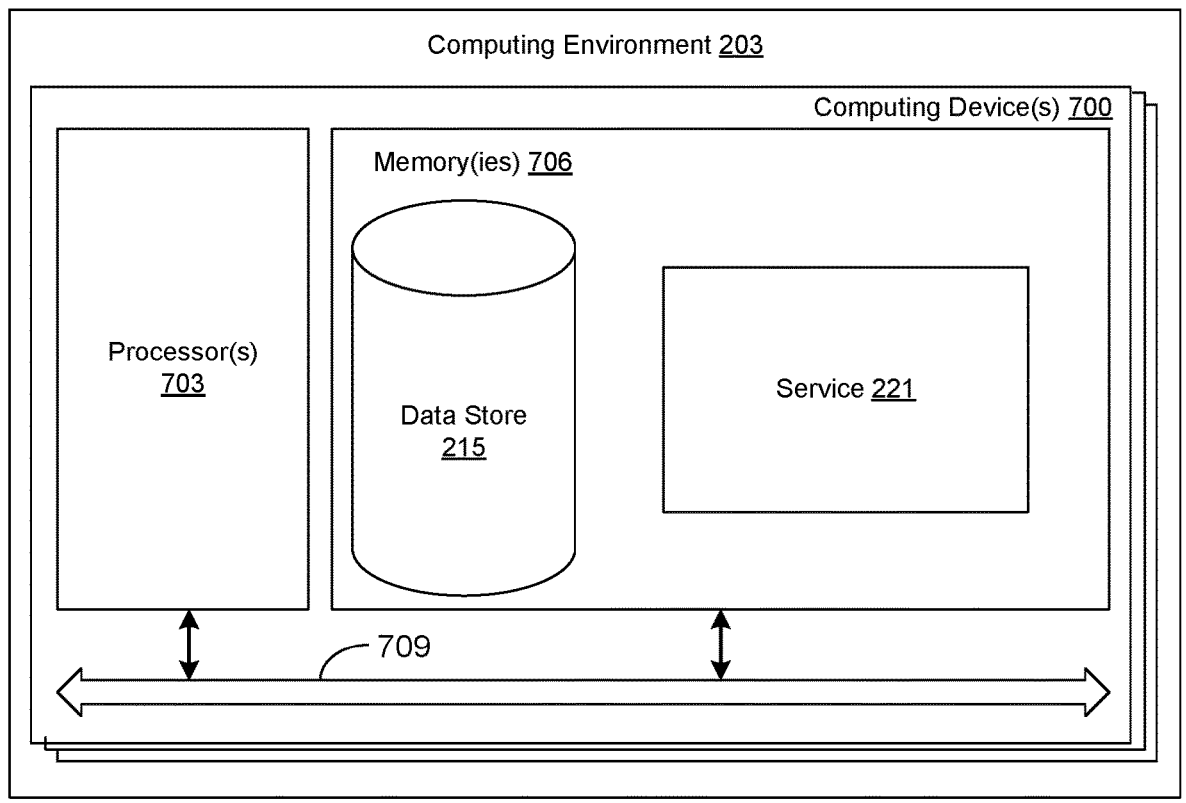
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is the service 221 and potentially other applications. Also stored in the memory 706 may be a data store 215 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic® Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the service 221, the client application 254 (FIG. 2), the application provider 245 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 3 and the flowcharts of FIGS. 4 and 5 show the functionality and operation of an implementation of portions of the service 221, the client application 254, and the application provider 245. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the sequence diagram of FIG. 3 and the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service 221, the client application 254, and the application provider 245, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the service 221, the client application 254, and the application provider 245, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive a voice command from a client device associated with a shared account to perform an action using a third-party application, wherein the shared account is associated with a plurality of users, and the client device is authenticated for access to the shared account using a registration credential;
   identify a user originating the voice command based at least in part on performing a voice recognition on the voice command;
   generate a request, with an application programming interface (API), to determine that the third-party application uses personal data, wherein the personal data is stored in a data store;
   communicate the request to an application provider of the third-party application;
   obtain, in response to the request, application requirements regarding the personal data;

determine that the application requires specific profile information about the user;
verify that the application provider has permission to access the personal data for a person profile associated with the shared account based at least in part on a person identifier of a token being associated with the person profile;
render, using a speaker on the client device, a question via speech synthesis, wherein the question requests consent from the user to share the personal data with the third-party application;
receive the consent from the user by a voice confirmation;
generate the token that includes an account identifier and the person identifier in response to receiving the consent, the account identifier corresponding to the shared account of the plurality of users, the person identifier corresponding to a person profile for the user in the shared account, the person identifier of the token being configured for a provider of the application to use the person identifier to access the person profile associated with the shared account;
anonymize the account identifier and the person identifier;
encrypt the anonymized account identifier and the anonymized person identifier within the token;
send the token and an indication of the action to the provider of the third-party application for authorizing the provider to perform the action based at least in part on receiving the consent, the token comprising the anonymized account identifier and the anonymized person identifier; and
personalize a service provided by the third-party application by providing the token having the anonymized account identifier and the anonymized person identifier, wherein the personalizing comprises correlating actions with the anonymized account identifier and the anonymized person identifier.

2. The non-transitory computer-readable medium of claim 1, wherein when executed the program further causes the at least one computing device to at least:
receive a request for the personal data of the user from the provider of the third-party application, the request including the token; and
send the personal data to the provider of the third-party application.

3. A system, comprising:
at least one computing device; and
at least one service executable in the at least one computing device, wherein when executed the at least one service causes the at least one computing device to at least:
receive a user request from a client device associated with a shared account to perform an action using an application, the shared account being associated with a plurality of users;
identify a user originating the user request;
generate a request, with an application programming interface (API), to determine that the application uses personal data, wherein the personal data is stored in a data store;
communicate the request to an application provider of the application;
obtain, in response to the request, application requirements regarding the personal data;
determine that the application requires specific profile information about the user;
verify that the application provider has permission to access the personal data for a person profile associated with the shared account based at least in part on a person identifier of a token being associated with the person profile;
render, using a speaker on the client device, a question via speech synthesis, wherein the question requests consent from the user to share the personal data with the application;
generate the token that includes an account identifier and the person identifier, the account identifier corresponding to the shared account of the plurality of users, the person identifier corresponding to a person profile for the user in the shared account, the person identifier of the token being configured for a provider of the application to use the person identifier to access the person profile associated with the shared account;
anonymize the account identifier and the person identifier;
encrypt the anonymized account identifier and the anonymized person identifier within the token;
send the user request and the token to the provider of the application for authorizing the provider to perform the action, the token comprising the anonymized account identifier and the anonymized person identifier; and
personalize a service provided by the application by providing the token having the anonymized account identifier and the anonymized person identifier, wherein the personalizing comprises correlating actions with the anonymized account identifier and the anonymized person identifier.

4. The system of claim 3, wherein when executed the at least one service further causes the at least one computing device to at least:
receive a request for personal data of the user from the provider of the application, the request presenting the token; and
send the personal data of the user to the provider of the application.

5. The system of claim 4, wherein the token encodes at least one permission relative to the personal data of the user.

6. The system of claim 4, wherein the personal data comprises at least one of: a name of the user or an email address of the user.

7. The system of claim 4, wherein when executed the at least one service further causes the at least one computing device to at least:
receive a result of the action being performed by the application from the provider of the application; and
send data to the client device encoding the result for presentation by the client device.

8. The system of claim 3, wherein the token is associated with a person profile permission for indicating an item in the person profile that is accessible to the provider.

9. The system of claim 3, wherein when executed the at least one service further causes the at least one computing device to at least:
determine that the application uses personal data of the user;
request a consent from the user via the client device to share the personal data with the provider of the application;
receive the consent from the user; and
wherein the person identifier is included in the token based at least in part on receiving the consent from the user.

10. The system of claim 9, wherein the consent is requested via synthesized speech rendered by the client device.

11. The system of claim 3, wherein the user request comprises a voice command captured via a microphone of the client device, and the user is identified based at least in part on a voice recognition of the voice command.

12. A method, comprising:
receiving, via at least one of one or more computing devices, a user request from a client device associated with a shared account to perform an action using a third-party application;
identifying, via at least one of the one or more computing devices, a user originating the user request;
determining, via at least one of the one or more computing devices, that the third-party application uses personal data;
generating a request, with an application programming interface (API), to determine that the third-party application uses personal data, wherein the personal data is stored in a data store;
communicating the request to an application provider of the third-party application;
obtaining, in response to the request, application requirements regarding the personal data;
determining that the application requires specific profile information about the user;
verifying that the application provider has permission to access the personal data for a person profile associated with the shared account based at least in part on a person identifier of a token being associated with a person profile;
rendering, using a speaker on the client device, a question via speech synthesis, wherein the question requests consent from the user to share the personal data with the third-party application;
receiving, via at least one of the one or more computing devices, a consent from the user to share the personal data with the third-party application;
generating, via at least one of the one or more computing devices, a token that includes an account identifier and the person identifier, the account identifier corresponding to the shared account, the person identifier corresponding to a person profile for identifying the user in the shared account, the person identifier of the token being configured for a provider of the third-party application to use the person identifier to access the person profile associated with the shared account;
anonymizing, via at least one of the one or more computing devices, the account identifier and the person identifier;
encrypting, via at least one of the one or more computing devices, the anonymized account identifier and the anonymized person identifier within the token;

sending, via at least one of the one or more computing devices, the token to the provider of the third-party application for authorizing the provider to perform the action based at least in part on receiving the consent, the token comprising the anonymized account identifier and the anonymized person identifier; and
personalizing a service provided by the third-party application by providing the token having the anonymized account identifier and the anonymized person identifier, wherein the personalizing comprises correlating actions with the anonymized account identifier and the anonymized person identifier.

13. The method of claim 12, wherein determining that the third-party application uses the personal data further comprises determining, via at least one of the one or more computing devices, that the third-party application uses the personal data in order to perform the action.

14. The method of claim 12, wherein anonymizing the account identifier and the person identifier based at least in part on consent received from the client device.

15. The method of claim 12, further comprising:
receiving, via at least one of the one or more computing devices, a request from the provider of the third-party application to access a! least a portion of the personal data, the request presenting the token; and
sending, via at least one of the one or more computing devices, the at least the portion of the personal data to the provider of the third-party application.

16. The method of claim 12, further comprising sending, via at least one of the one or more computing devices, the user request to perform the action to the provider of a third party application.

17. The method of claim 12, further comprising authenticating, via at least one of the one or more computing devices, the client device for access to the shared account prior to receiving the user request.

18. The method of claim 12, wherein the user is one of a plurality of users of the client device and the shared account.

19. The method of claim 12, wherein receiving the user request to perform the action further comprises
receiving, via at least one of the one or more computing devices, a voice command, and
identifying the user originating the user request further comprises performing, via at least one of the one or more computing devices, a voice recognition on the voice command.

20. The method of claim 12, further comprising:
determining, via at least one of the one or more computing devices, that the consent for the user is required to share the personal data based at least in part on a personal profile permission for the person identifier.

* * * * *

UNITED STATES PATENT AND TRADEMARK OFFICE
CERTIFICATE OF CORRECTION

| | | |
|---|---|---|
| PATENT NO. | : 12,380,450 B1 | Page 1 of 1 |
| APPLICATION NO. | : 16/918764 | |
| DATED | : August 5, 2025 | |
| INVENTOR(S) | : Nibha Dadheech | |

It is certified that error appears in the above-identified patent and that said Letters Patent is hereby corrected as shown below:

In the Specification

Column 14, Line 12 (approx.), delete "Visual Basic® Python®," and insert -- Visual Basic®, Python®, --.

In the Claims

Column 20, Claim 14, Line 19, delete "wherein anonymizing the" and insert -- wherein anonymizing, the --.

Column 20, Claim 15, Line 25, delete "access a! least" and insert -- access at least --.

Column 20, Claim 16, Line 32-33, delete "third party" and insert -- third-party --.

Signed and Sealed this
Sixteenth Day of September, 2025

Coke Morgan Stewart
*Acting Director of the United States Patent and Trademark Office*